June 10, 1952  R. E. SHVETZ  2,599,948
ROCKING CHAIR AND MUSICAL BOX COMBINATION
AND CLUTCH CONNECTION THEREFOR
Filed Oct. 31, 1950  2 SHEETS—SHEET 1

INVENTOR.
ROMAN E. SHVETZ
BY Robert Irving Williams
ATTORNEY

June 10, 1952 R. E. SHVETZ 2,599,948
ROCKING CHAIR AND MUSICAL BOX COMBINATION
AND CLUTCH CONNECTION THEREFOR
Filed Oct. 31, 1950 2 SHEETS—SHEET 2
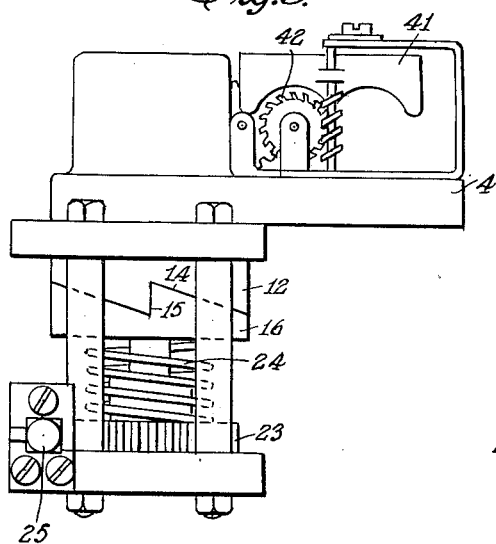
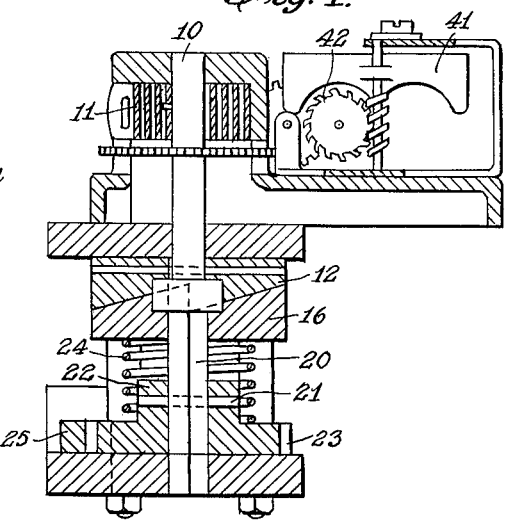
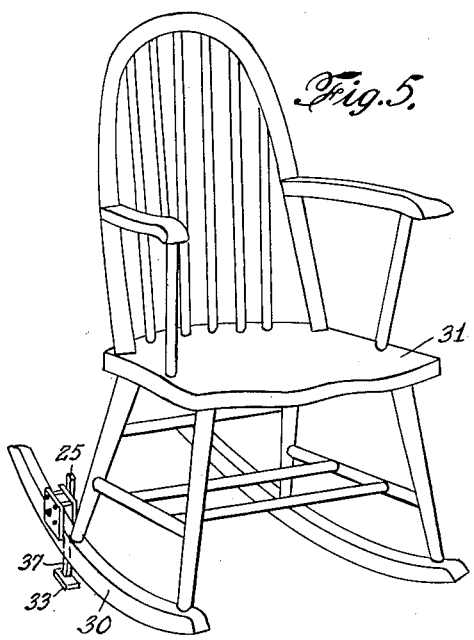
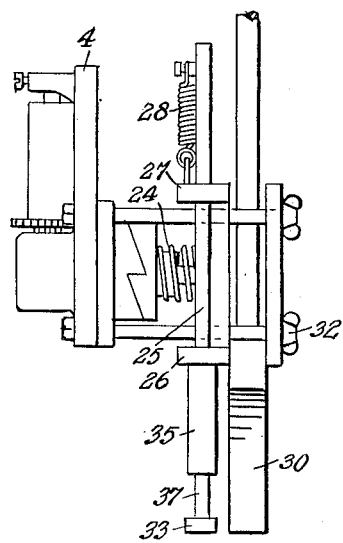
INVENTOR.
ROMAN E. SHVETZ
BY Robert Irving Williams
ATTORNEY Patented June 10, 1952

2,599,948

UNITED STATES PATENT OFFICE 2,599,948

ROCKING-CHAIR AND MUSICAL-BOX COMBINATION AND CLUTCH CONNECTION THEREFOR

Roman E. Shvetz, New York, N. Y.

Application October 31, 1950, Serial No. 193,229

3 Claims. (Cl. 84—95)

This invention relates to clutch connections and to various rocking-chair and music-box combinations embodying the same.

The use of music-boxes on rocking-chairs and the like has soothing and/or entertainment values but requires a simple, effective, and durable clutch connection for general use. The present invention, accordingly, contemplates the provision of such a clutch connection, of sound-unit combinations, of rocking-chair combinations, and of rocking-unit and sound-unit combinations, among which are a clutch unit and a sound-and-clutch unit adapted for ready attachment to or detachment from a rocking-chair or other rocking unit.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which:

Fig. 3 is a rear view on a reduced scale;

Fig. 4 is a sectional view on the same scale as Fig. 3 along the line 4—4 of Fig. 2;

Fig. 5 shows the unit mounted on a rocking-chair; and

Fig. 6 is an end view of the unit so mounted.

Figure 1:
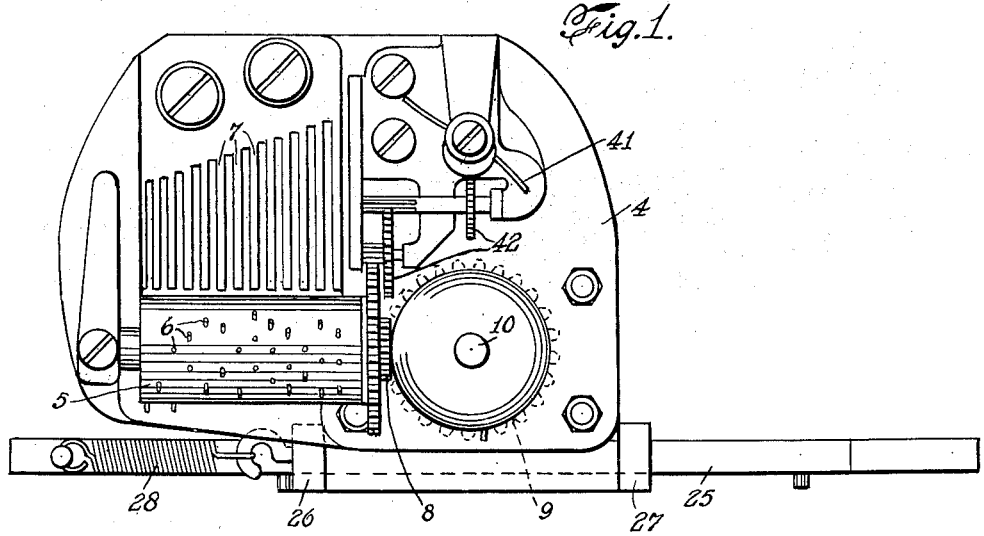
Figure 1 is a front view of one form of sound-and-clutch unit embodying the invention.
Figure 2:
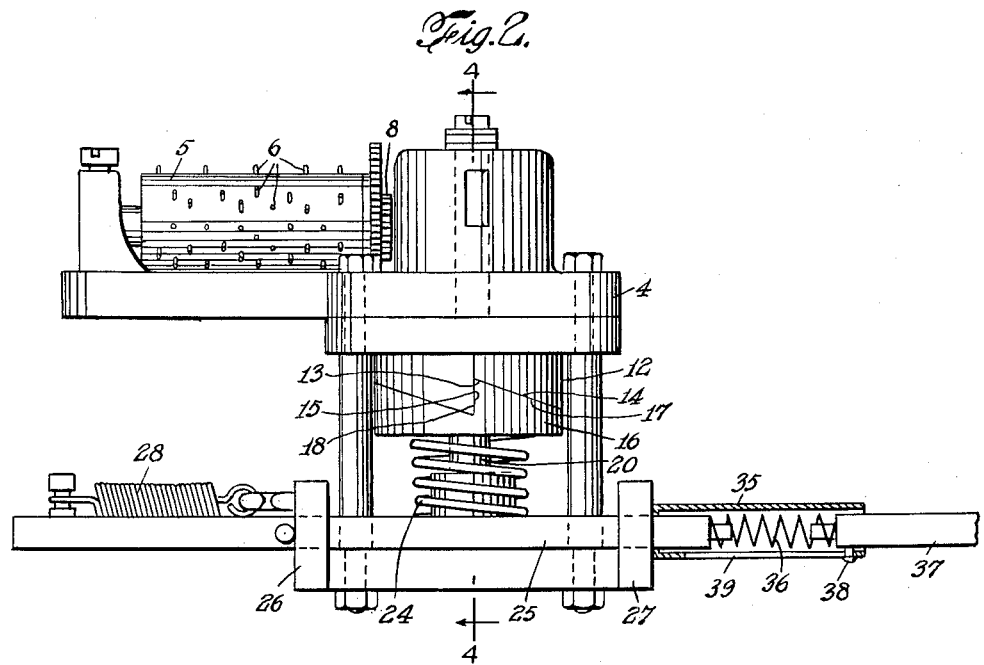
Fig. 2 is an end view thereof.

In the form of construction exemplified in the drawings, the unidirectional clutch device is mounted on a frame 4 and is utilized for operating a sound-unit in the form of a music-box. The sound-unit comprises a cylinder 5 carrying pins 6 which are adapted to contact various length musical springs 7 to give off musical sounds when the cylinder 5 rotates. Carried on the end of the cylinder to cause the rotation thereof is a pinion 8 which meshes with a gear 9 carried on a shaft 10 on the inner end of which is a watch-spring 11 and on the outer end of which is a clutch element 12 formed with notches 13 having sloping surfaces 14 facing in one direction and steep surfaces 15 facing in the other direction. There is provided a mating clutch element 16 having sloping surfaces 17 facing the sloping surfaces 14 and steep surfaces 18 facing the surfaces 15. The clutch element 16 is carried on a shaft 20 which is keyed by a pin 21 to the hub 22 of a gear 23 and is thrust toward the clutch element 12 by a spring 24. Meshing with gear 23 is a rack 25 which is slidably mounted on bearing members 26 and 27 (Figs. 2 and 6) and is normally forced downwardly (Fig. 6, to the right in Fig. 2) by a spring 28 which is strong enough to cause compression of the spring 24.

As exemplified in Figs. 5 and 6, the frame 4 is removably mounted on a rocker 30 of a rocking-chair 31 by means of wing nuts 32, the frame being so positioned that the rack 25 extends toward the floor on which the rocking-chair rests, as exemplified in Figs. 5 and 6. Thus, as the rocking-chair rocks, the rack 25 will first be forced upwardly by the floor to press the surfaces 15 against the surfaces 18 to wind the spring 11 and to rotate the cylinder 5. Then, as the portion of the rocker upon which the unit is mounted rises, the spring 11 will rotate the cylinder 5 while the rack 25 is forced downwardly by the spring 28; each sloping surface 17 slipping past a sloping surface 14 and compressing the spring 24 as each notch is passed by a corresponding tooth during this portion of the operation.

At the bottom end of the rack 25 there is carried a cylinder 35 within which is a stiff coil spring 36 below which is an end-piece 37 mounted for vertical sliding movement with respect to the cylinder 35 between pins 38 fitting into slots 39. The spring 36 is of sufficient strength so that it will not be compressed by the spring 28. It is also of such strength that it will not be compressed when the spring 11 is unwound, but will be compressed when the spring 11 is fully wound so as to prevent the breakage of the spring 11. A pressure plate 40 is provided on the bottom of the end piece to protect the floor.

A governor 41 is, in the present instance, connected to the cylinder 5 by means of gearing 42.

Since certain changes may be made in the above construction and different embodiments of the invention could be made without departing from the scope thereof, it is intended that all matter contained in the above description or shown in the accompanying drawings shall be interpreted as illustrative and not in a limiting sense.

I claim:

1. In a combination, a rockable member having a rocker, a reciprocable element carried on said rocker and projecting therefrom toward a floor on which said rockable member may rest, an operable member adapted to be carried on said rockable member and to be operated by said reciprocable element, yieldable means for urging said reciprocable element into contact with said floor, and a clutch arrangement connecting said operable member with said reciprocable member and comprising a driven member, a rotary clutch element operatively connected with said driven member and having a notched circular face, a rotary member geared to said reciprocable element, a rotary clutch element connected with said rotary member and mating with the first mentioned rotary clutch element and having a notched circular face, the notches in said faces having steep surfaces facing one another and opposing relative movement of said rotary clutch elements in one direction and sloping surfaces facing one another and permitting free relative movement of said rotary clutch elements in the other direction.

2. In combination, a rockable member, a seat thereon, a rocker, a sound unit carried on said rocker, a reciprocable element carried on said sound unit and projecting therefrom toward a floor on which said rockable member may rest, yieldable means for urging said reciprocable element toward such floor, operating means for said sound unit, and a unidirectional clutch connecting said reciprocable element and said operable means and comprising a reciprocable member, a rotary driven member, a rotary clutch element connected with said driven member and having a notched circular face, a rotary member geared to said reciprocable element, a rotary clutch element connected with said rotary member.

3. In combination, a rockable member, a seat thereon, a rocker, a sound unit carried on said rocker, a reciprocable element carried on said sound unit and projecting therefrom toward a floor on which said rockable member may rest, yieldable means for urging said reciprocable element toward such floor, a driving spring for said sound unit, and means including a unidirectional clutch operatively connecting said reciprocable element with said driving spring, said reciprocable element comprising a take-up spring which is stronger than said driving spring to prevent the exertion of breaking pressure on said driving spring when fully wound.

ROMAN E. SHVETZ.

REFERENCES CITED

The following references are of record in the file of this patent:

UNITED STATES PATENTS

| Number | Name | Date |
| --- | --- | --- |
| 339,547 | Hammelmann | Apr. 6, 1886 |
| 1,072,267 | Spohrer | Sept. 2, 1913 |
| 1,239,426 | Aufiero | Sept. 4, 1917 |
| 1,531,059 | Zajac | Mar. 24, 1925 |
| 2,251,141 | Lehman | July 29, 1941 |
| 2,550,991 | Goodman et al. | May 1, 1951 |